(No Model.)

J. L. ROWLAND.
MANUFACTURE OF ARTIFICIAL STONE.

No. 448,675. Patented Mar. 24, 1891.

Witnesses:
S. B. Brewer,
H. V. Scattergood.

Inventor:
James L. Rowland,
by William H. Low,
Attorney.

UNITED STATES PATENT OFFICE.

JAMES L. ROWLAND, OF TROY, NEW YORK.

MANUFACTURE OF ARTIFICIAL STONE.

SPECIFICATION forming part of Letters Patent No. 448,675, dated March 24, 1891.

Application filed January 3, 1888. Renewed August 28, 1890. Serial No. 363,266. (No model.)

*To all whom it may concern:*

Be it known that I, JAMES L. ROWLAND, formerly of the city and county of New York, but now of Troy, in the county of Rensselaer and State of New York, have invented new and useful Improvements in the Manufacture of Stone Artificially, of which the following is a full, clear, and exact description, reference being had to the accompanying drawings, which form part of this specification, and in which—

Figure 1:
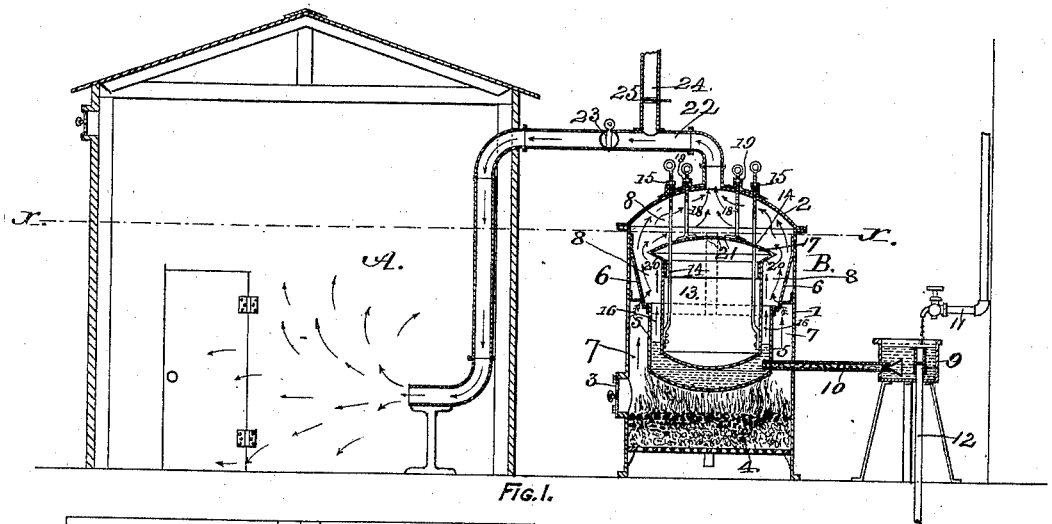
Figure 2:
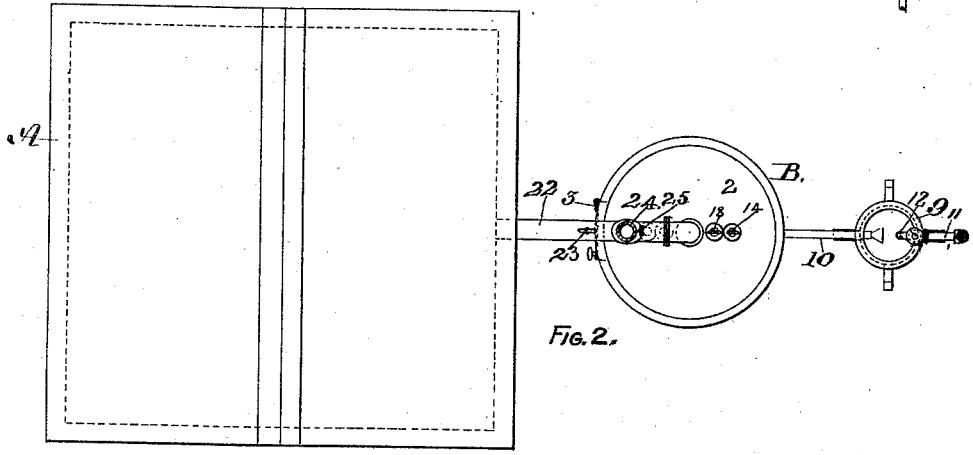
Figure 3:
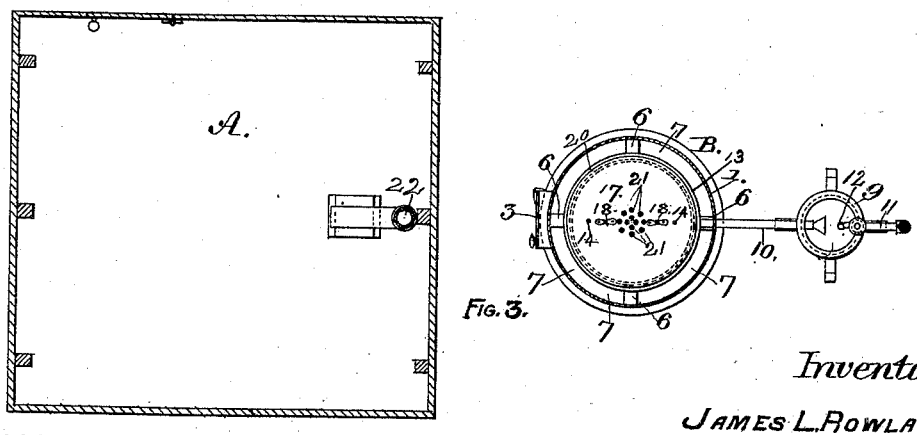

Figure 1 is a longitudinal section of my apparatus for carbonating forms of materials after they are molded or otherwise wrought into shape. Fig. 2 is a plan view of the same; and Fig. 3 is a horizontal section at the line X X on Fig. 1.

This invention relates to improvements in the manufacture of stone artificially, whereby the materials of which the stone is composed are, after being molded or otherwise wrought into a desired form and placed in a close chamber, subjected to the chemical action of gas evolved from the burning of carbonaceous matter commingled and interdiffused with the vapor of water until the mass becomes either partially or wholly carbonated or turned into stone.

This invention also relates to the apparatus for carrying this process of carbonation into effect.

As represented in the drawings, A designates the close chamber for containing the articles on which the process of carbonation is required to operate. Said chamber should be practically tight in order to retain the gaseous vapors therein; but it should be provided with a closely-fitting door to afford means of ingress and egress for the workmen employed.

B designates my apparatus for simultaneously generating carbonic dioxide and water-vapor, and effecting a commingling and interdiffusion of the same at a uniform temperature before they leave said apparatus. Said generating apparatus consists of a close casing 1, provided with a top 2, and charging-door 3. Said casing contains a fire-box 4, provided with a coal-grate suitable for maintaining a free combustion of the fuel used for generating the carbonic dioxide. A water-holder 5 is centrally suspended in said casing by means of hangers 6, so as to form an annular flue 7, through which the products of combustion ascend from the fire-box 4 into the commingling-chamber 8, the latter being formed by the inner side of the casing 1 and outer side of vessel 13, and the upper side of the cover 17 of said vessel and the under side of the top 2 of said casing. Said water-holder receives its supply of water from a tank 9, that is connected by a pipe 10 to said holder in such manner that the water-level in said tank and holder can be varied as required for producing the best effect in the operation of the apparatus. Water is fed into said tank through a supply-pipe 11; and in order that the water may not rise in said tank and holder above a predetermined line for producing the best effect, a waste-pipe 12 is inserted in said tank and has its inner end fitted so as to be adjusted to retain the water at the required height, the excess of water escaping from said tank through said waste-pipe. Within said water-holder a close vessel 13 is centrally suspended by means of screw-bolts 14, and in order that the altitude of said vessel may be adjusted, adjusting-nuts 15 are provided for said bolts. An annular passage 16 is formed between the outer side of said vessel and the inner side of said water-holder for the aqueous vapors, which are generated from the water contained in said holder, to pass upwardly through and thence into the commingling-chamber 8.

The vessel 13 is provided with a cover 17, that is fitted to slide telescopically in the upper end thereof, and for the purpose of adjusting said cover independently of any movement of the vessel 13 said cover is provided with screw-bolts 18, which pass out through the top 2 and are provided with adjusting-nuts 19. Said cover has a flaring head 20, that operates as a deflector to force outwardly, toward the sides of the casing 1, the aqueous vapors as they rise from the water-holder, so that said vapors will meet and commingle with the rising currents of carbonic dioxide generated in the fire-box 4, and thereby a thorough commingling and interdiffusion of said vapors and carbonic dioxide is effected within said commingling-chamber. The cover 17 has a series of perforations 21 provided for the escape of steam generated from water, from condensation or other source, which may accidentally enter the vessel 13. By means of the adjusting-screws 14 and 18 I am enabled by a single operation to effect a reduction of the water-space between the lower end of the vessel 13 and the bottom of the water-holder 5, so as to generate a greater volume of aqueous vapor, and simultaneously and correspondingly an increase of the capacity of the commingling-chamber 8. By the same means by a reversal of the operations the capacity of said water-space may be increased and the size of the commingling-chamber correspondingly decreased when occasion requires. By these changes the proportions of the aqueous vapors to the carbonic dioxide may be varied as may be required for most speedily effecting a thorough chemical combination of the gaseous mixture with the materials that in this process of carbonation are to be effected by it. A pipe 22 is centrally fixed to the top of the casing 1 for the purpose of conveying from the commingling-chamber 8 to the chamber A the aqueous vapors and carbonic dioxide after they have become thoroughly commingled and diffused and reduced to a uniform temperature in said commingling-chamber. Said pipe is carried into the chamber A, so that its inner end will nearly reach the floor of said chamber, and intermediately between said chamber and the generating apparatus B said pipe is provided with a closely-fitting damper 23, by which all communication between the chamber A and generating apparatus B can be closed when required. Between the damper 23 and generating apparatus B a branch pipe 24 leads from the pipe 22 and is open to the atmosphere. Said branch pipe serves as an outlet for the products of combustion while a fire is being kindled in the fire-box 4, and a closely-fitting damper 25 is fixed in said branch pipe for the purpose of closing the communication therethrough when occasion requires.

This apparatus is designed for carbonating articles made of hydraulic lime, quicklime, hydraulic cement, and compositions which contain calcined calcareous matter as a base. By this apparatus I am enabled to effect with great economy of fuel and very little attention a free generation of carbonic dioxide that is free from carbonic oxide and obviate any material loss of said dioxide from conversion after being generated into carbonic oxide. The fuel preferably used in this apparatus is coke without any admixture with charcoal or other material.

This apparatus operates in the following manner: The articles to be carbonated are placed in the chamber A, and before starting fire in the fire-box 4 the damper 23 is closed to prevent the smoke from the burning kindlings from entering said chamber, and simultaneously with the closing of said damper the passage through the branch-pipe 24 is opened to allow the smoke to escape into the atmosphere. After the fire is thoroughly kindled the damper 25 is closed and the damper 23 opened for the purpose of forcing the vapors from the generating apparatus B to pass into the chamber A. After the articles have been exposed to the action of said vapors for about ten hours, more or less, as occasion may require, the damper 23 is closed and the damper 25 opened, while the articles in the chamber A have their surfaces sprinkled with water, after which the damper 25 is closed and the damper 23 opened to force the vapors from the generating apparatus B to enter the chamber A, wherein they will permeate the articles contained in said chamber. The fuel in the fire-box 4 should be maintained in condition to produce a constant combustion during the time this process is being effected, which time will vary from about two days to about six days, the time required being dependent on the size of the articles and the character of the composition. In Letters Patent No. 137,322, granted to me April 1, 1873, and the reissue of the same, No. 7,084, dated April 25, 1876, I have shown and described apparatus for a like purpose; but they are defective for the reason that in one of the forms shown atmospheric air is permitted to commingle with the vapors generated from the furnace and from the water-holder, and in the other form shown the gas and vapor escape from the generating apparatus through separate pipes and are imperfectly commingled after leaving said generating apparatus.

My present invention, which embodies the generation of carbonic dioxide and aqueous vapors and a thorough commingling and interdiffusion of the same within the close casing of the generator and before leaving the latter, remedies the defects of my earlier apparatus.

Having fully described my invention, what I claim as new, and desire to secure by Letters Patent, is—

1. An apparatus for simultaneously generating carbonic dioxide and aqueous vapors and commingling the same therein, consisting of a close chamber containing a fire-box, a water-holder, and a close vessel centrally located in said water-holder, as and for the purpose herein specified.

2. The generating apparatus herein described, consisting of a close casing containing a fire-box, a water-holder, and a close vessel suspended in said water-holder, the water-holder being arranged within said casing to form an annular passage for the products of combustion from the fire-box, and said vessel being arranged to form within said water-holder an annular passage for the aqueous vapors from the latter, and above said water-holder a commingling-chamber in which the carbonic dioxide and aqueous vapors will be commingled and interdiffused before leaving the casing of the generating apparatus, as and for the purpose herein specified.

3. In a generating apparatus, the combination of a close casing containing a fire-box, a water-holder centrally fixed in said casing, and a close vessel centrally suspended in said water-holder and provided with adjusting-screws by which the altitude of said vessel can be regulated, said vessel having a cover which is fitted to slide telescopically in its upper end and which is provided with adjusting-screws for raising and lowering said cover without changing the altitude of said vessel, and an externally-located water-tank provided with an adjustable overflow-pipe and connected to said water-holder, all substantially as and for the purpose herein specified.

4. In a generating apparatus, the combination of a water-holder and an imperforate vessel centrally suspended in said water-holder by means of adjusting-bolts, whereby said vessel may be adjusted either upwardly or downwardly to increase or diminish the stratum of water contained in said water-holder and lying directly underneath the area of the suspended vessel, as and for the purpose herein specified.

JAMES L. ROWLAND.

Witnesses:
WM. H. LOW,
S. B. BREWER.